United States Patent Office 3,345,260
Patented Oct. 3, 1967

3,345,260
METHODS FOR CONTROLLING HELMINTHS IN ANIMALS USING CERTAIN ORGANOPHOSPHORUS COMPOUNDS
Stanley T. Ichikawa and Robert Young, Jr., Modesto, Calif., assignors to Shell Oil Company, New York, N.Y., a corporation of Delaware
No Drawing. Filed Feb. 24, 1965, Ser. No. 435,038
3 Claims. (Cl. 167—53)

ABSTRACT OF THE DISCLOSURE

Use of organophosphates of the formula:

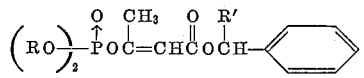

wherein R is alkyl of from one to four carbon atoms to control endoparasites in mammals and birds.

Description of the invention

Control of endoparasites—that is, internal parasites—of mammals and birds is one of the most important problems now encountered in animal husbandry. The magnitude of the problem is evident from the fact that internal parasites of livestock and poultry currently account for about half a billion dollars annual loss at the farm level, and that about twelve million dollars a year at the manufacturing level is spent annually for anthelmintics to control such parasites. Further losses, and costs for control of internal parasites are encountered in the raising of fur-bearing animals, domestic pets and the like. The parasitic helminths are of major importance.

The discovery of an effective, yet safe, anthelmintic has proven to be very difficult, for a successful anthelmintic must satisfy severe and in some ways contradictory requirements. Thus, a successful anthelmintic must; (a) be toxic to a wide spectrum of internal parasites; (b) not injure the host animal at the parasiticidally effective dosages; (c) be capable of ready introduction into the host animal by means which are adaptable to the treatment of few or many animals—as, for example, by incorporation into the animal's feed and/or water, which requires that the material be palatable to the animal; (d) not be inactivated by gastric juices and/or other body fluids and/or resist inactivation by microbes in the host animal; (e) that it can remain in the animal for a time sufficient to kill and/or cause elimination of the parasites from it; (f) not build up in concentration in the host animal—must be metabolized and/or excreted from the animal after it has done its job. In the case of ruminants, the successful anthelmintic also is one which does not adversely affect the microflora present in the rumen.

Since about 1956, organophosphorus compounds of various kinds have been investigated as possible anthelmintics, and many have been found to have potential value for this purpose. The organophosphorus anthelmintics have proven to have certain drawbacks however. All are more or less toxic to mammals and in many cases the safety factor—the ratio between the dosage toxic to the host animal and the parasiticidally effective dosage—is so small that extreme care must be taken in using these anthelmintics, and despite the greatest care it is not unusual to find the host animals adversely affected by the anthelmintic. Further, the phosphorus anthelmintics do not seem to act consistently, particularly when the host animal is a ruminant. A possible explanation for this behavior may be that organophosphorus compounds appear to be insufficiently stable to enable them to pass unchanged through the ruminant digestive system. In the case of monogastric animals, the instability of the phosphorus compounds would appear to be a factor in their sometimes inconsistent anthelmintic effects as well.

It now has been found that certain organophosphorus compounds according to this invention can be safely administered to domestic animals and household pets. These compounds possess a sufficient degree of safety to allow them to be used for anthelmintic purposes. At dosages which are effective for controlling internal parasites of animals, the compounds of the invention do not harm the host. Compounds effective in the method of this invention are certain dialkyl α-alkylbenzyl crotyl phosphates. Such organophosphates found useful as antihelmintics are characterized by the structural formula:

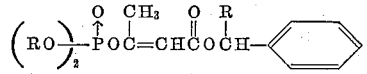

wherein each R is alkyl of one to four carbon atoms. The R substituents can be the same or they may be different. Examples of such antihelmintic compounds include, for example α-ethylbenzyl 3-(dimethoxyphosphinyloxy)-crotonate, α-ethylbenzyl-3-(diethoxyphosphinyloxy)crotonate, α-propylbenzyl 3-(dimethoxyphinyloxy)crotonate, α-propylbenzyl 3-(diethoxyphosphinyloxy)crotonate, α-butylbenzyl 3-(dimethoxyphosphinyloxy)crotonate, α-methylbenzyl 3-(diethoxyphosphinyloxy)crotonate, α-methylbenzyl 3-(dimethoxyphosphinyloxy)crotonate, α-methylbenzyl 3-(dipropyloxyphosphinyloxy)crotonate and α-methylbenzyl 3-(dibutyloxyphosphinyloxy)crotonate.

Preferred compounds for use in the invention are those having the structure:

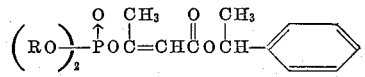

wherein R is alkyl of one to four carton atoms. Preferred because of its especial activity on a wide range of internal parasites of domestic animals is α-methylbenzyl 3-(diethoxyphosphinyloxy)crotonate. Also highly effective are α-methylbenzyl 3-(dimethoxyphosphinyloxy)crotonate, α-methylbenzyl 3-(dipropyloxyphosphinyloxy) crotonate and α-methylbenzyl 3-(dibutyloxyphosphinyloxy)crotonate.

The preparation of types of compounds of the invention has been disclosed in U.S. 2,982,686.

The organophosphorus compounds of the invention are effective against a wide spectrum of endoparasitic organisms, and are particularly effective against the endoparasitic roundworms, pinworms, whipworms, threadworms, caecal worms, stomach worms, hairworms, threadnecked worms, cooperids and the like. These compounds can act topically or systemically to control such endoparasites as bots, heel flies, screw-worms, cattle grubs and the like. In addition in certain cases the compound will pass through the digestive tract and render the animal feces unfit for fly maggot development. The organophosphorus compounds of the invention are effective against the following genera of important endoparasites, Taenia, Dipylidium, Toxocara, Ancylostoma, Haemonchus, Ostertagia, Trichostrongylus, Cooperia, Trichuria, Ascaris, Nematodirus, to name a few.

The organophosphorus anthelmintics of the invention are effective in controlling internal parasites of mammals and birds generally, and more particularly, in controlling endoparasities in livestock such as cattle, sheep, swine, horses and goats, in domestic pets, such as dogs and cats, in rabbits, in poultry such chickens, turkeys, geese and the like, in fur bearing animals such as mink, foxes, chinchilla, and the like.

The anthelmintics of the invention can be used to rid animals of infections by endoparasites or can be used to prevent infections.

The dosage of the anthelmintic to be used will depend upon the particular species or kind of parasite to be controlled, the particular anthelmintic employed, the formulation of the anthelmintic composition, the species of the host animal, whether the anthelmintic is used to cure the host animal of the parasite or whether it is used prophylactically to prevent infection. Such factors are well known to practitioners of the art. In general prophylactic dosages are lower than curative dosages. Thus dosages of as little as about 1 milligram per kilogram of body weight of the host animal may be required in some instances. The total dosage may be administered in a single dose, may be given to the animal at regular intervals, or continuously administered for a specific period of time.

The anthelmintic may be used neat and administered in capsule, it may be intubated, orally injected, given as a drench or it may be dissolved or suspended in a vehicle suitable for oral administration.

According to the present invention compositions suitable for treatment of animals include in addition to the active compounds of the invention, pharmaceutical or veterinary carriers which may either be solid or liquid materials. Preparations for oral injection can be liquids or solids or any combination of these forms, such as syrups, elixirs, emulsions, powders, capsules or tablets. Preparations for administration of the active agent in unit dose can take the form of compressed powders or tablets or of a powder enclosed in a suitable capsule of material such as gelatin. The compressed powders, tablets, or capsules may also comprise suitable excipients and/or diluents such as starch, lactose, stearic acid, magnesium stearate, dextrin, polyvinyl pyrrolidine or other diluents known to the pharmaceutical formulating art. The organophosphorus compounds used according to the invention may be dissolved in a solid resinous material such as polyvinyl chloride to provide formulations for the controlled release of the active anthelmintic.

Preparations for parenteral administration may be in the form of sterile solutions or suspensions in such liquids as water, physiological saline, benzyl alcohol solutions, ethyl oleate, corn oil, peanut oil, Carbowax 600 (water soluble polyethylene, approximate molecular weight 600), Carbowax 400 (water soluble polyethylene, approximate molecular weight 400), glycerol monooleate, Methocel (water soluble methylcellulose) dimethyl sulfoxide, and the like, and may contain soluble or insoluble diluents and/or solid or liquid excipients.

The compositions employed for the method of this invention may be used in feed supplements. Thus, such compounds may be mixed with an inert carrier or diluent. An inert carrier is one that is nonreactive with respect to the compounds and may be administered with safety to the animals to be treated. The carrier may be one of the ingredients of the animal feed or may be attapulgus clay, pyrophylite, bentonite and the like or may be of vegetable origin; corn cob meal, walnut shell flour, citrus meal, grain meal, grain hull meal or the like or may be of animal origin; bone meal, oyster shell meal, blood meal, fish meal and the like. When used as feed or water additives a dosage of as low as 1.0 part per million or as high as 1000 parts per million of the active ingredient may be required.

The efficacy of the method of this invention for controlling internal parasites in animals is demonstrated by the following experiments. The results are presented to show the use of the method and are not to be construed as limiting the scope of the invention.

*Example I.—Anthelmintic activity in mice*

Laboratory mice uniformly infected with the tapeworm *Hymenolepis nana*, and the pinworm, *Syphacia obvelata*, by standardized procedures were given a series of oral doses of the test compound. Two to three days after treatment the mice were sacrificed and the digestive tract was examined for the presence of parasites. The minimum effective dose of each compound was thus established. In addition, the maximum tolerated dose was determined on a limited number of mice by oral administration. Table I gives a summary of these data.

Also active in this test was α-propylbenzyl 3-(dimethoxyphosphinyloxy)crotonate.

TABLE I.—EFFICIENCY AGAINST MICE PARASITES

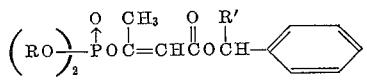

| R | R₁ | Oral LD₅₀, mg./kg. | Med¹ mg./kg. | Safety² ratio | Dose range for parasite clearing, mg./pg. | |
|---|---|---|---|---|---|---|
| | | | | | Tapeworm | Pinworm |
| CH₃ | CH₃ | 89 | <8 | 6 | 40-25 | 40-8 |
| C₂H₅ | CH₃ | 44 | 2 | 16 | 30-7 | 30-2 |
| C₃H₇ | CH₃ | 136 | 2 | 62 | 125-2 | 125-2 |
| C₄H₉ | CH₃ | 176 | 8 | 20 | 250-8 | 250-62 |
| CH₃ | C₂H₅ | 176 | 4 | 31 | 125-62 | 125-4 |
| C₂H₅ | C₂H₅ | ------- | 2 | 62 | 125-16 | 125-2 |

¹ Minimum effective dose.
² Therapeutic index = $\frac{\text{maximum tolerated dose}}{\text{minimum effective dose}}$

*Example II.—Tests with cats and dogs*

Cats heavily infected with the common tapeworm, *Taenia taeniaformis*, were orally dosed with the test compounds. After 27 days, the animals were sacrificed and the presence of parasites in the digestive tract was noted. The maximum tolerated dosage of the test compounds to cats by oral administration was also determined. The results are summarized in Table II.

TABLE II.—CAT EFFICACY AND SAFETY TESTS

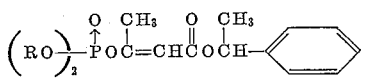

| R | Tolerated dose, mg./kg. | Test dose, mg./kg. | Cats cleared of tapeworms/number tested |
|---|---|---|---|
| CH₃ | >125 | 16 | 1/1 |
| C₂H₅ | >125 | 16 | 1/1 |
| C₃H₇ | >125 | 32 | 1/1 |
| C₄H₉ | 250-500 | 15 | 1/2 |

In tests with dogs it was found that the animals could tolerate at least 50 milligrams per kilogram body weight of α-methylbenzyl 3-(dimethoxyphosphinyloxy)crotonate and that an oral dose of 25 milligrams per kilogram body weight was effective in clearing the dogs of tapeworms and roundworms.

*Example III.—Sheep tests*

In tests involving a considerable number of animals, select compounds of the invention were administered orally to sheep to find the effective levels which controlled internal parasites and the quantity of the chemical which the animal could safely tolerate. These results have been summarized in Table III.

TABLE III.—ANTHELMINTIC ACTIVITY AND TOLERANCE IN SHEEP

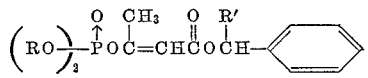

| R | R' | Maximum tolerated dose, mg./kg. | Minimum effective dose, mg./kg. |
|---|---|---|---|
| $CH_3$ | $CH_3$ | >1,000 | 1,000 |
| $C_2H_5$ | $CH_3$ | 250 | 10-20 |
| $C_3H_7$ | $CH_3$ | 125 | 12-25 |
| $C_4H_9$ | $CH_3$ | 12 | about 12 |
| $CH_3$ | $C_2H_5$ | >1,000 | 50-100 |
| $C_2H_5$ | $C_2H_5$ | 500-1,000 | 50-250 |

*Example IV.—Swine tests*

In a manner similar to that presented in Example III, the compounds of the invention were tested in a considerable number of hogs and the data are summarized in Table IV.

TABLE IV.—ANTHELMINTIC ACTIVITY AND TOLERANCE IN SWINE

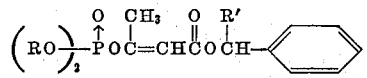

| R | R' | Maximum tolerated dose, mg./kg. | Minimum effective dose, mg./kg. |
|---|---|---|---|
| $CH_3$ | $CH_3$ | >1,000 | 500 |
| $C_3H_7$ | $CH_3$ | <500 | 31-62 |
| $CH_3$ | $C_2H_5$ | >1,000 | 500 |
| $C_2H_5$ | $C_2H_5$ | about 62 | 31 |

The subject matter regarded as the invention is defined in the following claims:

1. A method for controlling helminths in domestic animals which comprises administering to helminth-infested domestic animals an effective amount of a compound represented by the following formula:

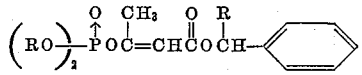

wherein each R independently represents alkyl of one to four carbon atoms.

2. A method for controlling helminths in domestic animals which comprises administering to helminth-infested domestic animals an effective amount of α-methylbenzyl 3-(diethoxyphosphinyloxy)crotonate.

3. A method for controlling helminths in domestic animals which comprises administering to helminth-infected domestic animals an effective amount of α-methylbenzyl 3-(dimethoxyphosphinyloxy)crotonate.

References Cited

UNITED STATES PATENTS 2,982,686  5/1961  Whetstone et al. _____ 167—30

ALBERT T. MEYERS, *Primary Examiner.*

R. BARRESE, *Assistant Examiner.*